Sept. 14, 1954 W. J. HUSHLEY 2,689,188
FLUORESCENT SCREEN OF A PHOSPHOR IN GLASS
AND METHOD FOR PRODUCING SAME
Filed Dec. 12, 1950
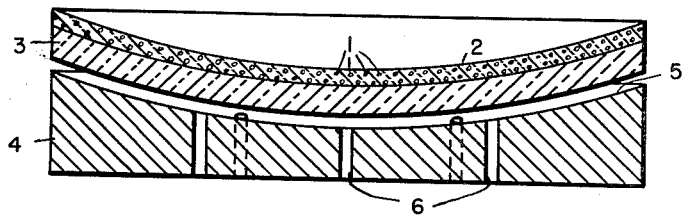
WITNESSES:
INVENTOR
Walter J. Hushley.
BY
ATTORNEY Patented Sept. 14, 1954

2,689,188

UNITED STATES PATENT OFFICE 2,689,188

FLUORESCENT SCREEN OF A PHOSPHOR IN GLASS AND METHOD FOR PRODUCING SAME

Walter J. Hushley, Pittsburgh, Pa., assignor to Westinghouse Electric Corporation, East Pittsburgh, Pa., a corporation of Pennsylvania Application December 12, 1950, Serial No. 200,368

4 Claims. (Cl. 117—23)

My invention relates to screens presenting extended areas of such phosphors as zinc sulphide. For practical reasons the phosphor in such screens must be present in a thin layer, and where such phosphor layers are deposited on conventional support plates, their surface is not very smooth, but shows considerable roughness and irregularity. This invention relates to screens of this type which must have extremely smooth surfaces, approaching that of plate glass. It is also of value for phosphor screens which are to be positioned in enclosures which contain alkali vapors or other substances likely to deleteriously affect the radiative properties of the screens. To give one illustration, image intensifier tubes are described in Hunter and Longini Patent 2,555,545, issued June 5, 1951 for an Image Intensifier, which contains a fluorescent (i. e. phosphor) screen bearing a photoelectric surface containing alkali metal at one end and a second phosphor screen at its other end. This application is a continuation-in-part of my application Serial No. 101,964, filed June 29, 1949 and now abandoned for a Method of Making Screens of a Phosphor Embedded in Glass.

An object of my invention is to form a phosphor screen in which the phosphor is protected by being embedded in a glass coating.

Another object is to provide a method of embedding particles of an X-ray phosphor such as zinc sulphide in a matrix of transparent glass in which they are completely enclosed beneath the glass surface.

Still another object of my invention is to provide a novel kind of protective matrix for particles of phosphor.

Other objects of my invention will become evident upon reading the following description taken in connection with the drawing, the single figure of which shows in cross-section a phosphor screen made in accordance with the principles of my invention.

Referring to the drawing, the completed phosphor screen embodying the principles of my invention comprises particles 1 of a phosphor, such as zinc sulphide, calcium tungstate, cadmium tungstate, barium lead sulphate or zinc cadmium sulphide, embedded in a matrix 2 of glass, the latter preferably completely covering the tops of the phosphor particles and having a smooth glossy surface. The under surface of the glass is preferably smooth also, and the entire composite sheet non-porous.

The following description applies specifically to the making of a fluorescent screen for an X-ray image intensifier tube such as that described in the above-entitled application of Hunter and Longini, but the same methods may be applied to fluorescent screens for other uses.

The screen herein described is about six inches in diameter and in the shape of a watchglass with a radius of curvature of about ten inches. The support or backing 3 of the fluorescent layer is glass having a coefficient of thermal expansion between 7 and 10 microinches per inch per degree centigrade. The thickness of the glass backing 3 is preferably from 0.04 to 0.06 inch, such units consisting of soda-lime glass being readily available because used for lantern slides. However, thicknesses ranging from 0.02 to 0.25 inch have been used successfully in accordance with the methods herein described. Clear and white opaque commercial glasses other than soda-lime glasses have also been used. The glass in which the phosphor is embedded is much faster melting than the supporting glass. Compositions of suitable embedding glass are described in more detail and range in my copending application Serial No. 200,367 for Glass for Embedding Zinc Sulphide Phosphors, filed concurrently herewith. A composition which I have found very suitable comprises relative parts by weight: silica, 20; alumina, 3; magnesia, 2; lithium oxide, 2; sodium oxide, 5; potassium oxide, 2; boric oxide, 66, these amounts referring to the batch put into the melting crucible in manufacturing the glass. Another glass I have likewise found suitable is made by firing a batch in which the listed ingredients are in relative parts by weight: 20 $SiO_2$, 3 $Al_2O_3$, 2 $MgO$, 2 $Li_2O$, 5 $Na_2O$, 3 $K_2O$, 65 $B_2O_3$.

The embedding glass as above described is ground to a powder capable of passing through a sieve having 100 to 200 meshes per inch, preferably 150 mesh. It is then mixed with approximately equal weight of an X-ray phosphor powder, such as zinc sulphide, which has particle sizes averaging about 20 microns. This mixture is then deposited evenly to a thickness of about 100 mg. per square centimeter on a supporting glass which appears at 3 in the drawing. This supporting glass may at the outset have the form of a flat disc six inches in diameter and about 0.05 inch thick. The deposited powder is then made smooth by pressing it or by rolling a cylinder over it. The flat glass disc with the smooth layer above described is then placed on a metal support 4 as shown in the drawing. The support 4 is of cast iron and, for making screens of the watchglass form, its upper surface 5 is concave upwards with a radius of curvature approximately the same as desired for the finished fluorescent screen, that is to say in this case, a radius of about 10 inches. The support 4 may have perforating holes or grooves 6 to permit escape of the atmosphere from under the supporting glass when the latter is heated in the furnace. The metal support is preferably preheated in an oven to a temperature of 200° C. to 450° C. before the glass disc is placed upon it. The support and disc are then placed in an oven and the temperature is raised until the glass powder melts and envelops the phosphor powder to form a reasonably smooth glassy layer of phosphor embedded in glass as shown. As a result of this heating, the glass disc 3 may sag and conform to the curvature of the surface 5. For commercial soda-lime glass discs, such as are used in lantern slides and for the embedding glasses mentioned above, a temperature of 680° C. maintained for about half an hour will both embed the phosphor and properly shape the supporting glass.

While I have given above one typical and satisfactory method of following my invention, certain details may be varied in the way in which I will now describe.

The supporting glass itself may be either clear, opalescent, or opaque; the purpose of opalescent or opaque glass is to reflect or absorb light emitted into the glass by the phosphor particles. An additional layer of substance which will reflect light may be placed between the supporting glass and the embedding glass. Such a reflecting layer may be made by mixing powdered embedding glass and a material which does not readily dissolve in that glass and appears white. Such a material may, for instance, be fused alumina or magnesia. This powder mixture may be heated to form a glassy layer before the layer of phosphor and glass particles is deposited, or alternatively, the two layers may be deposited one after the other and only one heating employed. An absorbing layer, on the other hand, may be made by mixing a black material like graphite powder with an embedding glass and depositing it on the supporting glass before the phosphor layer is put on. It is desirable that the embedding glass shall have a coefficient of expansion which is smaller than the supporting glass so that the phosphor glass layer is in compression; otherwise, this layer may develop cracks which are objectionable for many purposes. This requirement is, however, not imperative and the embedding glasses described in my above-mentioned concurrently filed application may be used with any glass having an expansion coefficient between 7 and 10 microinches per inch per degree centigrade, provided the viscosity of the supporting glass is much higher than that of the embedding glass at the temperature used for embedding. I also believe that supporting glasses of somewhat lower and higher expansion coefficients than those given may be found satisfactory for many purposes.

The temperature used for embedding the phosphor depends on the embedding glass, on the supporting glass, on the degree of glassy smoothness required and on the duration of heating. Temperatures of 650° C. to 700° C. for half an hour are preferred but temperatures of 600° C. to 900° C. have been used successfully. A temperature of 800° C. for a few minutes will produce almost the same result as 700° C. for half an hour, but the glass-phosphor layer will contain more pores. The optimum time of heating is also affected by the capacity of the oven and by the size of the metal support under the supporting glass. It is desirable to keep the oven at 450° C. to 500° C. until the metal support and the glass on it approach the oven temperature before increasing the temperature to about 700° C. Having the metal support preheated at 200° C. to 450° C. prevents cracking of the thin glass supporting plate; otherwise a very slow heating schedule is usually necessary. It is also desirable to put a thin layer of powder, such as alumina powder, between the metal support and the glass plate to prevent the glass plate from adhering to the metal if the temperature is high enough to soften the supporting glass.

The relative amount of phosphor and glass used in the phosphor-glass powder mixture may be varied over certain limits depending on the degree of glossy smoothness required. The maximum amount by weight of phosphor to glass found practical to use is about 2 to 1 when the phosphor is zinc sulphide with average particle size about 15 to 25 microns. A ratio of about 1.2 to 1 is preferred. Other phosphors, such as calcium tungstate and barium lead sulphate, require somewhat more glass, while cadmium tungstate requires less. The optimum ratio depends also on the density of the particular glass used. Phosphor powders that are very fine, for example, having particles 1 to 5 microns, require more glass relative to phosphor; otherwise, the mixture fuses into a frit instead of a glassy smooth surface. The larger the phosphor particles, the easier it is to obtain a glassy surface. There is no particular limit to the maximum amount of glass to be used with a given amount of phosphor except as determined by the use of the fluorescent screen. The relative amount of phosphor and glass powder also depends on the nature of the embedding glass. Embedding glass with a high alkali content forms a frit more readily than glasses of low alkali content. Very fine glass powders form smoother surfaces than coarse powders. Glass powders that pass meshes per inch of 100 to 200 are preferred, but powders of 50 to 350 mesh have been used successfully. The phosphor-in-glass mixture need not be uniform throughout its thickness. The phosphor may be prevented from coming in contact with the supporting glass by depositing a layer of embedding glass before the phosphor-glass mixture is deposited. Similarly, a layer of embedding glass on top of the mixture may be used to give a glassy surface to a mixture which forms a frit underneath. This top glass layer may preferably be of a glass having more chemical durability than the glass mixed with the phosphor. For example, a greater resistance to water would be obtained by using a glass in which the lithium oxide content was increased at the expense of sodium and potassium oxides and such inert materials as silica and alumina were increased at the expense of boric oxide. This top glass layer need not have the fluidity of the glass mixed with the phosphor since glass alone flows more readily than when mixed with phosphor. The embedding glass need not be of one composition but may be almost any mixture of suitable embedding glasses as described in the concurrently filed application mentioned above.

The embedding glass need not be colorless. Blue colored and slightly smoky opalescent glasses have both been used to reduce the green afterglow of blue-emitting zinc sulphide phosphor. Glasses of other colors could be used for desired color effects.

While I have found that for screens used in image intensifier tubes, such as those described in the above-mentioned Hunter and Longini patent, a phosphor thickness of about 50 mg. per square centimeter is most satisfactory and is preferably used with approximately an equal weight of glass; screens having up to 200 mg. per square centimeter of phosphor have operated satisfactorily, and there is no reason to believe that this thickness could not be exceeded. The phosphor itself need not be of one variety but may be a mixture such, for example, as zinc sulphide with calcium tungstate. Furthermore, a layer of one phosphor may be deposited on top of a layer of any different phosphor, these being mixed in the same glass, or alternatively with different glasses, and being embedded either successively or simultaneously.

The atmosphere of the oven in which the phosphor is embedded into the glass is preferably made inert by use of a gas, like nitrogen, particularly for the sulphide-type phosphors, although oxidizing or slightly reducing atmospheres may be used for the more stable phosphors such as calcium tungstate.

For image intensifier tubes, the fluorescent screen should have a transparent electrically conducting layer on its front surface. This may be applied by spraying a solution of stannic chloride in alcohol upon the screen heated to about 600° C.

While the use of a glass support for the phosphor-in-glass layer has been described, other ceramic material such as steatite and some porcelains have been used successfully. However, they are not easily given the shape required for image intensifier tubes and have a coefficient of expansion lower than most fast-melting embedding glasses.

I claim as my invention:

1. The method of forming a phosphor screen which comprises forming on a plate of soda-lime glass a mixture consisting of about equal weights of zinc sulphide and an embedding glass, said glass consisting essentially of 20% by weight silica, 3% alumina, 2% magnesia, 65% boric oxide, 2% lithium oxide, 5% sodium oxide and 3% potassium oxide, all said percentages being by weight, and heating said glass plate to about 680° C. for about half an hour.

2. The method of forming a phosphor screen which comprises forming on a layer of glass which has about the same expansivity as soda-lime glass a mixture which consists essentially of about equal weights of a phosphor and an embedding glass, heating said mixture to about 680° C. for about half an hour, said phosphor being made up from the group consisting of zinc sulphide, barium lead sulphate, calcium tungstate, and cadmium tungstate, and said glass consisting essentially of from 5% to 15% of an alkali compound made up from the group consisting of the oxides and fluorides of sodium, potassium, and lithium mixed with 10% to 25% silica, 55% to 80% boric oxide, 0% to 6% magnesia, 2% to 12% alumina, all said percentages being by weight.

3. A fluorescent screen comprising a plate of soda-lime glass coated with a layer of embedding glass in which are submerged particles of zinc sulphide averaging about 20 microns in diameter, said embedding glass consisting essentially of 20% by weight silica, 3% alumina, 2% magnesia, 65% boric oxide, 2% lithium oxide, 5% sodium oxide, and 3% potassium oxide.

4. A fluorescent screen comprising a layer of glass which has about the same expansivity as soda-lime glass coated with a layer of embedding glass in which are submerged particles of a phosphor made up from a group consisting of zinc sulphide, barium lead sulphate, calcium tungstate, and cadmium tungstate, said embedding glass consisting essentially of from 5% to 15% of an alkali compound made up from the group consisting of oxides and fluorides of sodium and lithium mixed with 10% to 25% silica, 55% to 80% boric oxide, 0% to 6% magnesia, 2% to 12% alumina, all said percentages being by weight.

References Cited in the file of this patent

UNITED STATES PATENTS

| Number | Name | Date |
| --- | --- | --- |
| 1,364,951 | O'Hara | Jan. 11, 1921 |
| 2,049,765 | Fischer | Aug. 4, 1936 |
| 2,094,630 | Winninghoff | Oct. 5, 1937 |
| 2,123,939 | Germer | July 19, 1938 |
| 2,238,784 | Scott et al. | Apr. 15, 1941 |
| 2,439,192 | Sun et al. | Apr. 6, 1948 |
| 2,573,200 | Hushley | Oct. 30, 1951 |

FOREIGN PATENTS

| Number | Country | Date |
| --- | --- | --- |
| 606,819 | Great Britain | Aug. 20, 1948 |